United States Patent
Rajagopal et al.

(10) Patent No.: US 10,691,897 B1
(45) Date of Patent: Jun. 23, 2020

(54) ARTIFICIAL INTELLIGENCE BASED VIRTUAL AGENT TRAINER

(71) Applicant: Accenture Global Solutions Limited, Dublin (IE)

(72) Inventors: Vidya Rajagopal, Bangalore (IN); Kokila Manickam, Salem (IN); Marin Grace Mercylawrence, Bangalore (IN); Gaurav Mengi, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/555,539

(22) Filed: Aug. 29, 2019

(51) Int. Cl.
| | |
|---|---|
| *G06F 40/35* | (2020.01) |
| *G10L 25/30* | (2013.01) |
| *G10L 21/18* | (2013.01) |
| *G06K 9/62* | (2006.01) |
| *G06F 40/247* | (2020.01) |

(52) U.S. Cl.
CPC ............ *G06F 40/35* (2020.01); *G06F 40/247* (2020.01); *G06K 9/6257* (2013.01); *G06K 9/6264* (2013.01); *G10L 21/18* (2013.01); *G10L 25/30* (2013.01)

(58) Field of Classification Search
CPC ..... G06F 40/35; G06F 40/247; G06K 9/6264; G06K 9/6257; G10L 25/30; G10L 21/18
See application file for complete search history.

(56) References Cited

U.S. PATENT DOCUMENTS

| | | | | |
|---|---|---|---|---|
| 7,305,345 | B2 * | 12/2007 | Bares | G06Q 30/02 379/88.01 |
| 8,428,948 | B1 * | 4/2013 | Roizen | G06F 16/3344 704/251 |
| 2015/0228273 | A1 * | 8/2015 | Serban | G10L 15/18 704/254 |
| 2016/0062604 | A1 * | 3/2016 | Kraljic | G06F 3/0482 715/771 |
| 2016/0189558 | A1 * | 6/2016 | McGann | G09B 5/06 434/219 |
| 2018/0082184 | A1 * | 3/2018 | Guo | G10L 15/22 |
| 2018/0329884 | A1 * | 11/2018 | Xiong | G06N 3/0445 |
| 2018/0357220 | A1 * | 12/2018 | Galitsky | G06F 40/205 |
| 2018/0357221 | A1 * | 12/2018 | Galitsky | G06F 40/289 |
| 2019/0138595 | A1 * | 5/2019 | Galitsky | G06F 40/205 |
| 2019/0147346 | A1 * | 5/2019 | Reicher | G16H 30/40 706/11 |

(Continued)

*Primary Examiner* — Angela A Armstrong
(74) *Attorney, Agent, or Firm* — Brinks Gilson & Lione

(57) ABSTRACT

The present disclosure relates to a system, a method, and a product for an artificial intelligence based virtual agent trainer. The system includes a processor in communication with a memory storing instructions. When the processor executes the instructions, the instructions are configured to cause the processor to obtain input data and generate a preliminary set of utterances based on the input data, process the preliminary set of utterances to generate a set of utterance training data, generate a set of conversations based on the set of utterance training data, simulate the set of conversations on a virtual agent to obtain a conversation result, verify an intent and a response based on the conversation result, verify a use case flow and flow hops based on the conversation result, and generate recommendation information and maturity report based on verification results.

14 Claims, 22 Drawing Sheets

(56) References Cited

U.S. PATENT DOCUMENTS

| | | | |
|---|---|---|---|
| 2019/0205773 A1* | 7/2019 | Ackerman | G06F 16/288 |
| 2019/0243916 A1* | 8/2019 | Ashoori | G06F 16/9024 |
| 2019/0243917 A1* | 8/2019 | Ashoori | G06F 16/3344 |
| 2019/0272323 A1* | 9/2019 | Galitsky | G06F 40/253 |
| 2019/0294925 A1* | 9/2019 | Kang | G06N 20/00 |
| 2019/0297033 A1* | 9/2019 | Harma | H04L 51/02 |
| 2019/0319898 A1* | 10/2019 | Scanlon | G06N 20/00 |

* cited by examiner

| IntentID | Intent | Base Utterance | Industry Word | Slot/Entity |
|---|---|---|---|---|
| 1 | bookappointment | book an appointment for meter instalation | smart meter;meter;sm | |
| 2 | cancelappointment | cancel meter instalation | smart meter;meter;sm | |
| 3 | bookingconfirmation | yes;ok;fine | | |
| 4 | bookingrejection | no;do not ;reject ;no thanks | | |
| 5 | cancelationconfirmation | yes;ok;fine | | |
| 6 | cancelationrejection | no;do not ;reject ;no thanks | | |
| 7 | Date | Book on Monday | | |
| 8 | wantbookappointment | yes;ok;fine | | |
| 9 | Dontwantbookappointment | no;do not ;reject ;no thanks | | |
| 10 | bookappointmentwithdate | book appointment on xxx date | smart meter;meter;sm | Date |
| 11 | cancelappointmenwithdate | cancel appointment scheduled on xxx date | smart meter;meter;sm | Date |

Convert a flow chart to a decision tree
710

Convert the decision tree to a numeric model
720

Build a Seq2Seq data set based on the decision tree and the numeric model
730 reading one or more of the numeric model, the Seq2Seq model, and the set of utterance training data to generate the conversation for a use case, and in case of voice bot, picking the voice file number along with a user utterance.
740

Figure 7A

| Sno | Intent1 722-1 | Elgibility 722-2 | Intent2 722-3 | BookingDate 722-4 | Intent3 722-5 | Appointment Booked 722-6 |
|---|---|---|---|---|---|---|
| 1 | bookappointment | 1 | BookingDate | 1 | bookingconfirmation | 1 |
| 2 | bookappointment | 0 | | -1 | | 0 |
| 3 | bookappointment | 1 | BookingDate | 1 | bookingrejection | 0 |
| 4 | bookappointment | 1 | unknownintent | -1 | | 0 |
| 5 | unknownintent | -1 | | -1 | | 0 |
| 6 | bookappointment | 1 | BookingDate | 1 | unknownintent | 0 |
| 7 | bookappointment | 1 | BookingDate | 1 | cancelappointment | 0 |
| 8 | bookappointment | 1 | cancelappointment | 0 | | 0 |

| Intent | Response |
|---|---|
| bookappointment | 1-Please provide the date of appointment - Date format DD-MM-YYYY [Date] ;0-Sorry you are not eligible for booking smart meter appointment |
| cancelappointment | 1-Do you want to cancel appointment on xxx date;0-No appointment to cancel . Do you want to book an appointment |
| bookingconfirmation | Appointment Booked |
| bookingrejection | Please provide the another date of appointment - Date format DD-MM-YYYY [Date] |
| cancelationconfirmation | Appointment canceled. Do you want to book new appointment |
| cancelationrejection | Appointment on XXX date not canceled |
| BookingDate | 1-Can you confirm appointment date DD-MM-YYYY;0-Date is invalid provide the date in DD-MM-YYYY [Date] |
| wantbookappointment | Please provide the date of appointment - Date format DD-MM-YYYY [Date] |
| Dontwantbookappointment | Thanks |
| unknownintent | Sorry I didn't understand. Can you pls try to referhase your sentence |

```
┌─────────────────────────────────────────────────────────────────┐
│              Read the test data in xls/txt              910     │
└─────────────────────────────────────────────────────────────────┘
                                │
                                ▼
┌─────────────────────────────────────────────────────────────────┐
│ Use the automation script to simulate the user action as given  │
│ in the test data, which includes typing user text on chatbot    │
│ window, selecting menu on chatbot window, and playing the voice │
│ file in case of voice Bot                                 920   │
└─────────────────────────────────────────────────────────────────┘
                                │
                                ▼
┌─────────────────────────────────────────────────────────────────┐
│ Use the automation script to record Bot response, which         │
│ includes capturing the text response from Bot, when the Bot     │
│ includes a voice bot capturing the voice response, and when     │
│ menu's are displayed capturing the menu's displayed       930   │
└─────────────────────────────────────────────────────────────────┘
                                │
                                ▼
┌─────────────────────────────────────────────────────────────────┐
│ Verify the expected Bot response against the observed Bot       │
│ response, which includes Intent mismatch, not identified        │
│ utterance, and business logic failure                     940   │
└─────────────────────────────────────────────────────────────────┘
                                │
                                ▼
┌─────────────────────────────────────────────────────────────────┐
│ Generate summary report of the conversation simulator     950   │
└─────────────────────────────────────────────────────────────────┘
```

Figure 9

```
┌─────────────────────────────────────────────────────────────────────┐
│ Read a chat line from a virtual agent corresponding to a conversation for a use case │
│                                                                1110 │
└─────────────────────────────────────────────────────────────────────┘
                                    │
                                    ▼
┌─────────────────────────────────────────────────────────────────────┐
│          Verify an intent and a response based on the chat line      │
│                                                                1120 │
└─────────────────────────────────────────────────────────────────────┘
                                    │
                                    ▼
┌─────────────────────────────────────────────────────────────────────┐
│          Verify a use case flow and flow hops based on the chat line │
│                                                                1130 │
└─────────────────────────────────────────────────────────────────────┘
                                    │
                                    ▼
┌─────────────────────────────────────────────────────────────────────┐
│                      Generate analytical result                      │
│                                                                1140 │
└─────────────────────────────────────────────────────────────────────┘
```

Figure 11A

1120 when the chat line includes user utterances, verifying the intent of the virtual agent identified by the NLP engine against an expected intent obtained from the DNN model   1122 when the intent of the virtual agent matches the expected intent, verifying the response of the virtual agent based on a Seq2Seq flow   1124 identifying new keywords and utterances;   1126 counting a number of utterances and a number of intents based on the chat line.   1128

```
┌─────────────────────────────────────────────────────────────────────────┐
│ computing intent maturity based on the bench mark data of set similar   │
│ intent and a chat analytics data according to at least one of a number  │
│ of key words, an utterance distribution, a number of utterance          │
│ identified, a number of utterance mismatch, a number of utterance       │
│ not identified;                                              1320       │
└─────────────────────────────────────────────────────────────────────────┘
                                    │
                                    ▼
┌─────────────────────────────────────────────────────────────────────────┐
│ computing use case maturity based on the bench mark data set of similar │
│ use cases and the chat analytics data according to at least one of a    │
│ number of users, a number of successful conversations, a number of      │
│ failed conversations, a number of intent failures and intent maturity   │
│ for an use case                                              1340       │
└─────────────────────────────────────────────────────────────────────────┘
                                    │
                                    ▼
┌─────────────────────────────────────────────────────────────────────────┐
│ computing Bot maturity based on the bench mark data set of similar Bots │
│ and the chat analytics data according to at least one of a number of    │
│ users, a number of successful conversations, a number of failed         │
│ conversations, a total number of key words learnt by the bot, and a     │
│ use case maturity                                            1360       │
└─────────────────────────────────────────────────────────────────────────┘
                                    │
                                    ▼
┌─────────────────────────────────────────────────────────────────────────┐
│ generating a recommendation based on at least one of new utterance to   │
│ be added to the NLP, wrong intent identified that need to be relooked   │
│ in NLP, problem flows identified (for example, most dropped flows by    │
│ the user), a number of users to be simulated /use case flows, and a     │
│ gap in the utterance distribution range                      1380       │
└─────────────────────────────────────────────────────────────────────────┘
```

ARTIFICIAL INTELLIGENCE BASED VIRTUAL AGENT TRAINER

TECHNICAL FIELD

This disclosure relates to artificial intelligence (AI), and is particularly directed to an AI based virtual agent trainer.

BACKGROUND

Over the past decade, human and AI collaboration has evolved at a very noticeable pace. Humans may have digital colleagues and assistants, e.g., AI agents or tools, to support them in their daily activities.

Virtual agents, such as chatbots, emailbots, salesbots, and/or AI assistants, may be deployed with intelligent algorithms working in the background to assist users with inquiries and provide suggestions, directions, and/or other useful information. When the users are interacting with the virtual agent, the virtual gent interprets and responds to natural language utterances. The existing virtual agent may have a low accuracy and undesired maturity level. A virtual agent may be trained with various conversational scenarios to increase its accuracy and authenticity.

The present disclosure describes a system, a method, and a product for training AI based virtual agents, which may overcome some of the challenges and drawbacks discussed above, improving accuracy and authenticity of the virtual agents.

SUMMARY

The present disclosure describes a system for computer-based virtual agent trainer. The system includes a memory storing instructions, and a processor in communication with the memory. When the processor executes the instructions, the instructions are configured to cause the processor to obtain input data, generate a preliminary set of utterances based on the input data, and process the preliminary set of utterances to generate a set of utterance training data. When the processor executes the instructions, the instructions are configured to cause the processor to generate a set of conversations based on the set of utterance training data, and simulate the set of conversations on a virtual agent to obtain a conversation result. When the processor executes the instructions, the instructions are configured to cause the processor to verify an intent and a response based on the conversation result, verify a use case flow and flow hops based on the conversation result, and generate recommendation information and maturity report based on verification results.

The present disclosure also describes a method for computer-based virtual agent training. The method includes obtaining, by the device, input data. The device includes a memory storing instructions and system circuitry in communication with the memory. The method includes generating, by the device, a preliminary set of utterances based on the input data and processing, by the device, the preliminary set of utterances to generate a set of utterance training data. The method includes generating, by the device, a set of conversations based on the set of utterance training data; and simulating, by the device, the set of conversations on a virtual agent to obtain a conversation result. The method includes verifying, by the device, an intent and a response based on the conversation result; verifying, by the device, a use case flow and flow hops based on the conversation result; and generating, by the device, recommendation information and maturity report based on verification results.

The present disclosure further describes a product for computer-based virtual agent training. The product includes machine-readable media other than a transitory signal; instructions stored on the machine-readable media; and a processor in communication with the machine-readable media. When the processor executes the instructions, the processor is configured to obtain input data, generate a preliminary set of utterances based on the input data, and process the preliminary set of utterances to generate a set of utterance training data. When the processor executes the instructions, the processor is configured to generate a set of conversations based on the set of utterance training data, and simulate the set of conversations on a virtual agent to obtain a conversation result. When the processor executes the instructions, the processor is configured to verify an intent and a response based on the conversation result, verify a use case flow and flow hops based on the conversation result, and generate recommendation information and maturity report based on verification results.

BRIEF DESCRIPTION OF THE DRAWINGS

FIG. 4B shows an exemplary embodiment of an intent-sample utterance file.

FIG. 7A shows a flow diagram of a method for building a conversation.

FIG. 7D shows a numerical model corresponding to the decision tree in FIG. 7C.

FIG. 7E shows a sequence-to-sequence (Seq2Seq) model corresponding to the decision tree in FIG. 7C and/or the numerical model in FIG. 7D.

FIG. 9 shows a flow diagram of a method for simulating a conversation.

FIG. 11A shows a flow diagram of a method for analyzing a conversation.

FIG. 11B shows a flow diagram of step 1120 in the method in FIG. 11A.

FIG. 13 shows a flow diagram of a method for generating a maturity report and recommendation.

DETAILED DESCRIPTION

Figure 1:
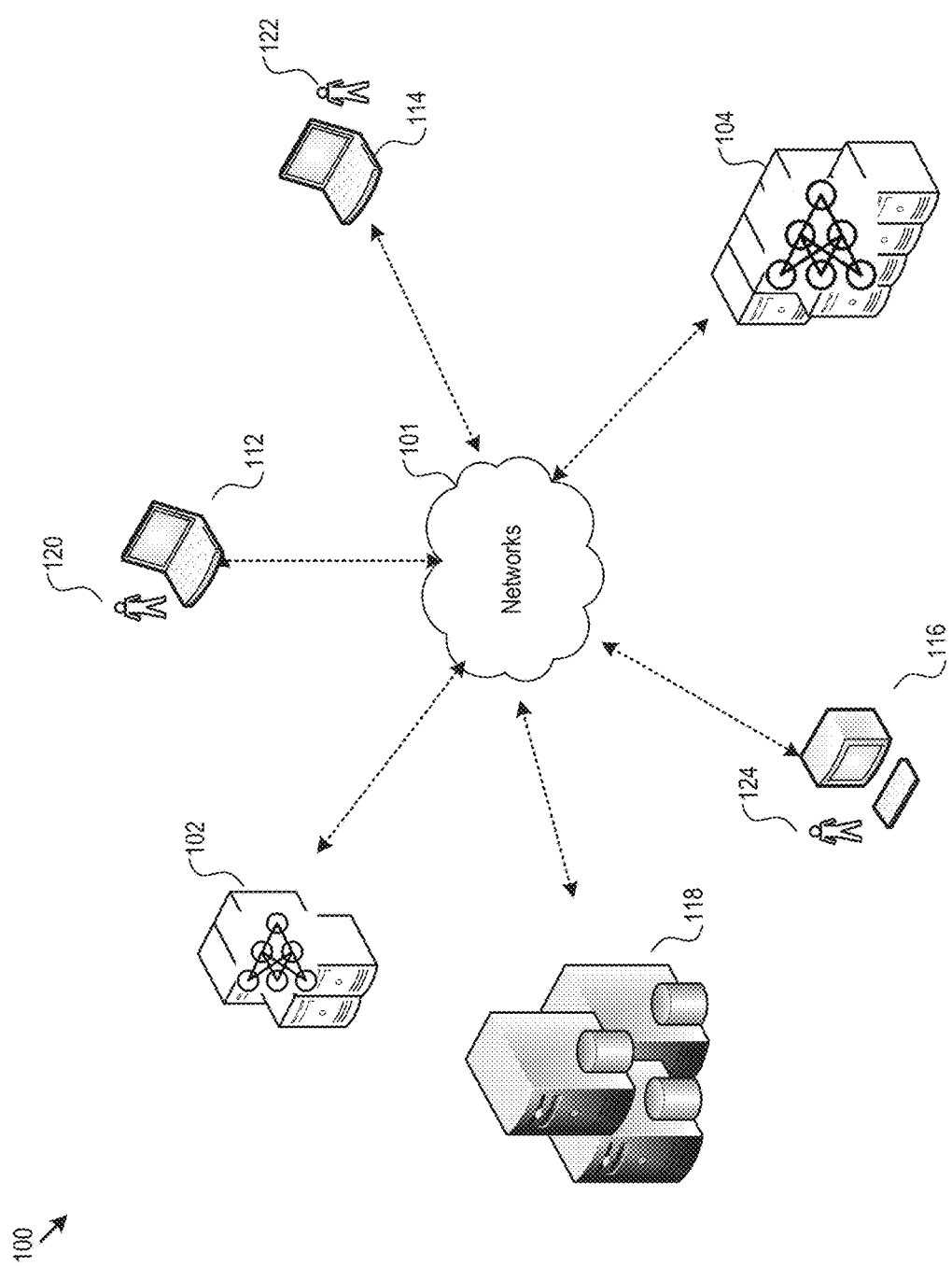
FIG. 1 shows an exemplary electronic communication environment for implementing an AI based virtual agent trainer.

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Virtual agents, such as chatbots, emailbots, salesbots, and AI Assistants (collectively Bots), may be deployed with intelligent algorithms working in the background to assist users with inquiries and provide suggestions, directions, and other useful information. When users are interacting with the virtual agent, the virtual agent may interpret and respond to natural language utterances, which may include voice or text based natural language input.

A virtual agent under development may be trained with various conversational scenarios to increase the accuracy and authenticity of the virtual agent. Virtual agent developers design the virtual agent to handle a variety of possible utterances input to the virtual agent. However, conceiving or creating a large corpus of possible utterances for training the virtual agent may be restricted due to limited human resources, time constraints, and the large demand placed on computing resources. Developing, training, and testing virtual agents may involve substantial amounts of time and computing resources. Moreover, inadequate test coverage may result in erroneous and/or inauthentic responses from virtual agents.

The present disclosure describes a method and device for solving at least one or more problems associated with traditional methods for training Bots, for example, problems include low accuracy and undesired maturity level of the trained Bots.

The present disclosure describes an artificial intelligence (AI) based novel automation framework for building automated training data set, generating conversations, analyzing Bot's response to the generated conversation analyzer, and providing a maturity scorer and recommendation for the trained Bot.

The present disclosure may be implemented to train and/or test a Bot during a Bot's development/production stage to improve the Bot's accuracy and authenticity. The present disclosure may also be implemented to train and/or test a Bot during a post-development stage to assess the Bot's accuracy and authenticity.

One example of a technical advancement achieved by the method and device described herein may be that the described AI trainer may train one or more Bots in an automated and/or systematic manner. For example, the described AI trainer may build test conversations based on auto-generate training data set, may automatically interact with the Bot to obtain conversation results from the Bot, analyze the conversation results to generate a maturity scorer for the Bot, and formulate recommendations for the Bots. The recommendation may include how each of the Bots improves its accuracy and authenticity, which may be used for a next round of training. The recommendation may include how the AI trainer may improves its performance, which may be used for a next round of generating training data sets and analyzing Bot's responses.

Another example of a technical advancement achieved the method and device described herein may be that the described AI trainer may be used to generate a library of test conversations for Bots in one particular industry, one particular service sector, and/or one particular linguistic context. Test conversations may be generated and/or compiled based on sample intent utterances and/or industry keywords. The generated test conversations may be quickly identified/accessed from the library based on the industry keywords as test input for a Bot that operate in a particular industry/context.

Another example of a technical advancement achieved by the method and device described herein may be that the described AI trainer may increase training efficiency and coverage while decreasing memory demands and processing time. For example, generating utterances, generating voice files, building and simulating conversations, analyzing conversation results, and generating a maturity score and recommendation for the trained Bot may be implemented in one or more modules interacting with each other, and the described AI trainer integrates the above modules together. Accordingly, computer processing speed may be increased, memory utilization may be reduced, computing resources conserved, and/or virtual agent's training efficiency/coverage may be increased according to the technical advancements described herein. Additional benefits, efficiencies, and improvements over existing market solutions are made evident in the method and device described below.

The present disclosure is structured as following sections: an electronic environment and a computer system for implementing a framework of an AI based virtual agent trainer, a framework architecture of an AI based virtual agent trainer, and various components and embodiments of various components of an AI based virtual agent trainer.

Electronic Environment and Computer System for Implementing an AI Based Virtual Agent Trainer FIG. 1 shows an exemplary electronic communication environment 100 in which an AI based virtual agent trainer may be implemented. The electronic communication environment 100 may include a virtual agent 102, an AI based virtual agent trainer 104, one or more user devices 112, 114, and 116 associated with users 120, 122, and 124, and one or more databases 118, in communication with each other via public or private communication networks 101.

The virtual agent 102 may be implemented as a central server or a plurality of servers distributed in the communication networks. While the virtual agent 102 shown in FIG. 1 is implemented as a single server, the virtual agent 102 may be implemented as a group of distributed servers, or may be implemented on a same server as the AI based virtual agent trainer 104.

The AI based virtual agent trainer 104 may be implemented as a central server or a plurality of servers distributed in the communication networks. While the AI based virtual agent trainer 104 shown in FIG. 1 is implemented as a single server, the AI based virtual agent trainer 104 may be implemented as separate servers, or a single group of distributed servers.

FIG. 1 shows the example in which the virtual agent and the AI based virtual agent trainer are implemented on different server. In other implementation, the virtual agent and the AI based virtual agent trainer may be implemented on a same server or a same group of distributed servers.

The user devices 112, 114, and 116 may be any form of mobile or fixed electronic devices including but not limited to desktop personal computer, laptop computers, tablets, mobile phones, personal digital assistants, and the like. The user devices 112, 114, and 116 may be installed with a user interface for accessing the virtual agent and/or the AI based virtual agent trainer. The one or more database 118 of FIG. 1 may be hosted in a central database server, a plurality of distributed database servers, or in cloud-based database hosts. The database 118 may be organized and implemented in any form, including but not limited to relational database containing data tables, graphic database containing nodes and relationships, and the like. The database 118 may be configured to store the intermediate data and/or final results for implementing the virtual agent and the AI based virtual agent trainer.

Figure 2:
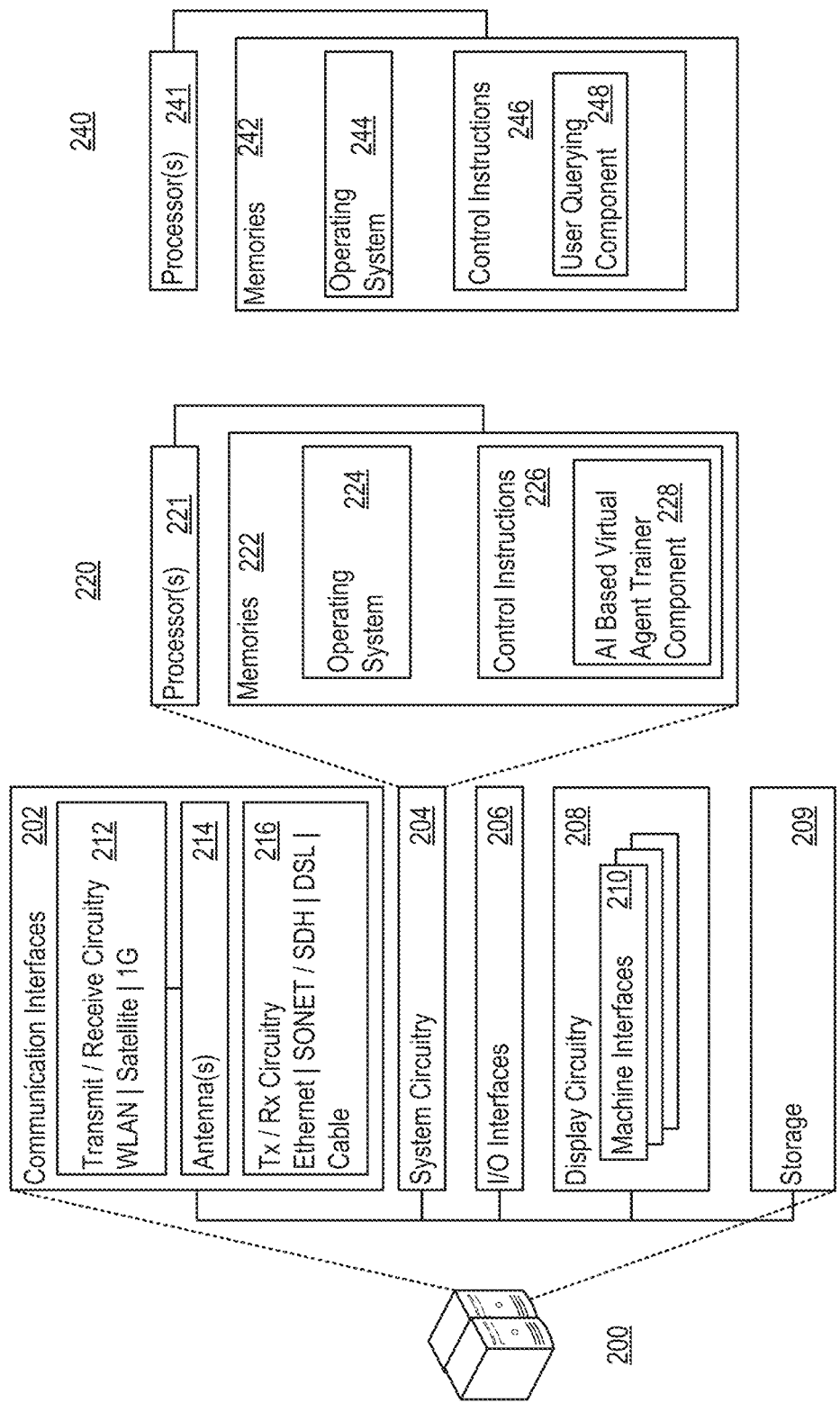
FIG. 2 shows computer systems that may be used to implement various components of the electronic communication environment of FIG. 1.

FIG. 2 shows an exemplary computer system 200 for implementing the virtual agent 102, the AI based virtual agent trainer 104, or the user devices 112, 114, and 116. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 209 may be used to store various initial, intermediate, or final data or model for implementing the AI based virtual agent trainer. These data corpus may alternatively be stored in the database 118 of FIG. 1. In one implementation, the storage 209 of the computer system 200 may be integral with the database 118 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

For example, the system circuitry 204 may be implemented as 220 for the AI based virtual agent trainer 104 of FIG. 1. The system circuitry 220 of the AI based virtual agent trainer may include one or more processors 221 and memories 222. The memories 222 stores, for example, control instructions 226 and an operating system 224. The control instructions 226, for example may include instructions for implementing the components 228 of a AI based virtual agent trainer. In one implementation, the instruction processors 221 execute the control instructions 226 and the operating system 224 to carry out any desired functionality related to the AI based virtual agent trainer.

Likewise, the system circuitry 204 may be implemented as 240 for the user devices 112, 114, and 116 of FIG. 1. The system circuitry 240 of the user devices may include one or more instruction processors 241 and memories 242. The memories 242 stores, for example, control instructions 246 and an operating system 244. The control instructions 246 for the user devices may include instructions for implementing a user querying component 248. In one implementation, the instruction processors 241 execute the control instructions 246 and the operating system 244 to carry out any desired functionality related to the user devices.

Framework for AI Based Virtual Agent Trainer

Figure 3:
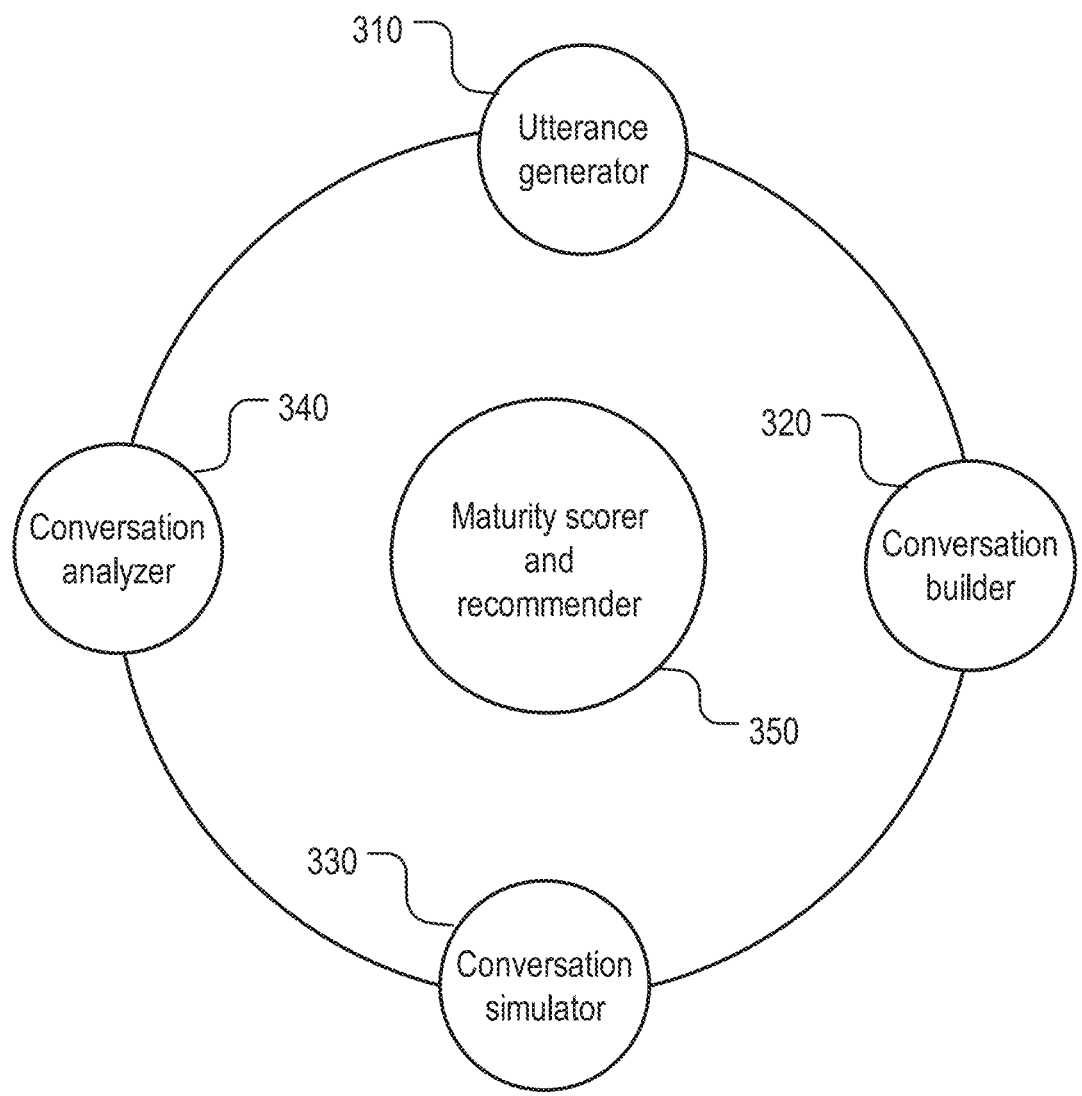
FIG. 3 shows a framework for an AI based virtual agent trainer.

The present disclosure describes a system for an AI based virtual agent trainer, which may include a portion or all components as shown in FIG. 3. The system 300 may be an AI based virtual agent trainer. The system for the AI based virtual agent trainer 300 may include an utterance generator 310, a conversation builder 320, a conversation simulator 330, a conversation analyzer 340, a maturity scorer and recommender 350.

In one implementation, at least one portion of the AI based virtual agent trainer 300 may be implemented in Python.

The AI based virtual agent trainer 300 may include one or more AI machine learning networks, including but not limited to, K-means, term frequency-inverse document frequency (TF-IDF), random forest, deep neural network (DNN) classifier, sequence to sequence (Seq2Seq) model, recurrent neural network (RNN), and linear regression. The AI based virtual agent trainer 300 may include one or more voice processing network, for example but not limited to, a text-to-speech (TTS) generator/simulator and a speech-to-text (STT) generator/simulator.

In one implementation, at least one portion of the AI based virtual agent trainer 300 may be implemented in a cloud platform.

The utterance generator 310 may generate an utterance training date set based on intent and/or entity/slots for an Industry. The input of the utterance generator 310 may include industry specific utterances, one or more key words, or a historical chat conversation log data set from respective industry. The utterance generator 310 may implement one or more algorithms, including, individually or in combination, K-mean clustering, N-gram, Bag-of-words, sentence similarity scorer, Markov dictionary, and Markov sentence generator. The utterance generator 310 may include a text utterance generator and/or a voice utterance generator. The text utterance generator may generate an utterance training date set in text format. The voice utterance generator may generate an utterance training date set in voice format.

The conversation builder 320 may generate a list of all possible conversation trees for a use case and integrate the utterance data set into the test trees. The input of the conversation builder 320 may include use case flow, and/or utterance data set. The conversation builder 320 may implement one or more algorithm, including, individually or in combination, a random forest decision tree and Seq2Seq model. In one implementation, the conversation builder 320 may output the generated test conversations directly to train a Bot. In another implementation, the conversation builder 320 may store the generated test conversations in a file and a Bot which is ready to be trained may access the file at a later time point.

The conversation simulator 330 may automatically simulate the test conversations on the Bot. The conversation simulator 330 may send the user's portion of the test conversations to the Bot and receive Bot's response from the Bot as the conversation result. The conversation simulator 330 may automate the execution of the training via multiple channels, for example, via mobile application (APP) or a web interface. Optionally, the conversation simulator 330 may include a voice based simulator for TTS, so that test conversations in voice format may be sent to the Bot for training.

The conversation analyzer 340 may analyze the conversation results. The conversation results may be in a format of chat logs communicating between the Bot and the AI trainer. The conversation analyzer 340 may include a feedback mechanism. The conversation analyzer 340 may analyze the conversation results against the sequence to sequence model and highlight unknown utterances, Intent hops, wrong intent, etc. which may be sent back to the utterance generator 310 as training data set.

The maturity scorer and recommender 350 may generate the maturity scorer of the trained Bot and provide recommendation to achieve better performance for the trained Bot. The maturity scorer and recommender 350 may include a predictive algorithm to compute an overall maturity of the trained virtual agent and individual use cases. The maturity scorer and recommender 350 may recommend the improvements in terms of utterances, use cases, path issues, etc.

Embodiment for Utterance Generator

The present disclosure describes a method and device for generating a set of utterance training data. An utterance generator may generate an utterance training date set based on intent and/or entity/slots for an Industry. The utterance generator may include a text utterance generator and/or a voice utterance generator. The text utterance generator may generate an utterance training date set in a text format. The voice utterance generator may generate an utterance training date set in a voice format.

Figure 4A:
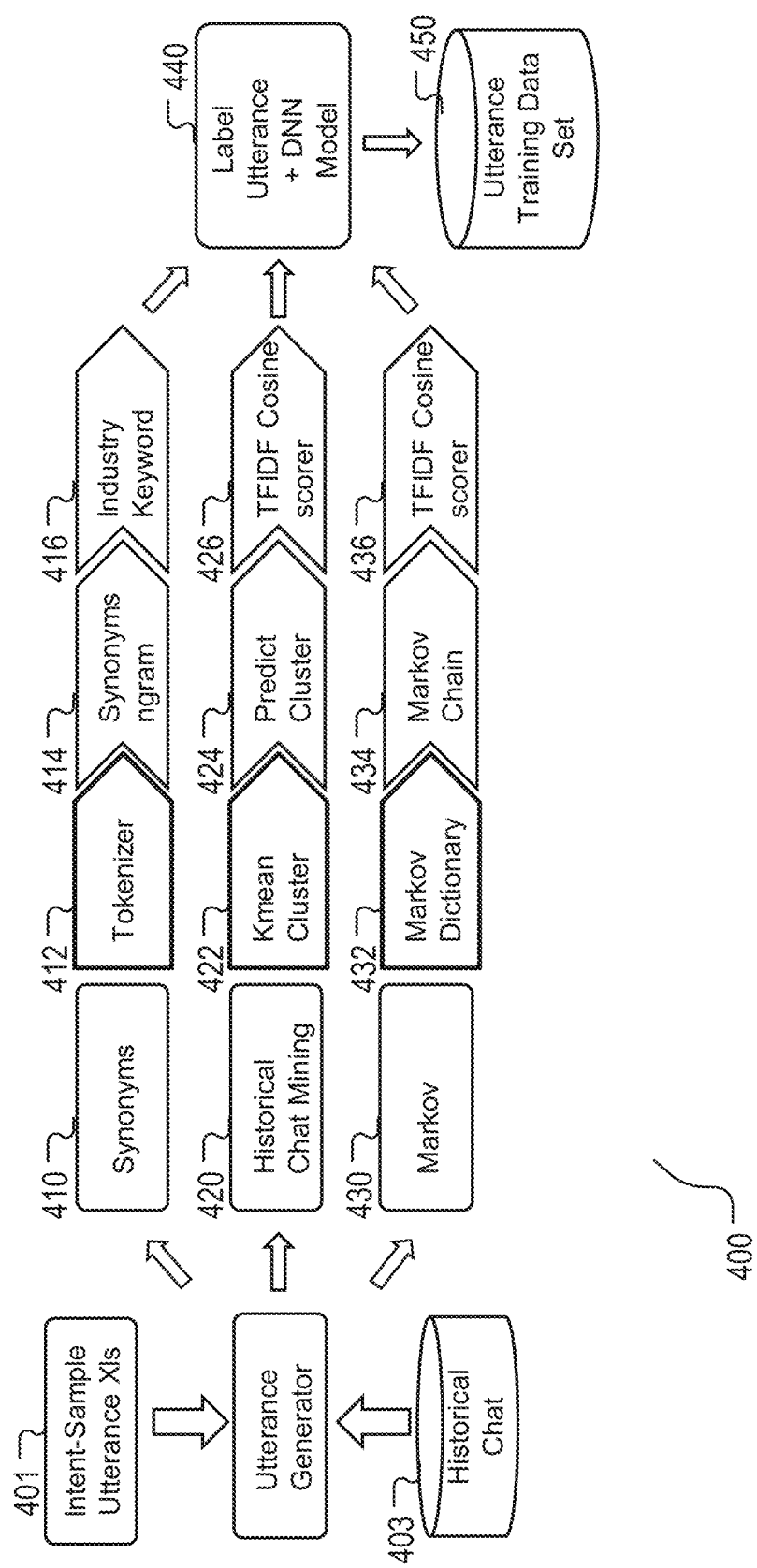
FIG. 4A shows an exemplary embodiment of an utterance generator.

Referring to FIG. 4A, the present disclosure describes a framework of an utterance generator 400. The utterance generator may receive inputs from an intent-sample utterance file 401 and/or a historical chat record 403. Based on at least one of algorithms, the utterance generator 400 may output a set of utterance training data. For example but not limited to, the algorithms may include a synonym method, a historical chat mining method, or a Markov method.

Referring to FIG. 4B, in one implementation, the intent-sample utterance file 401 may include at least one column of an intent ID 401*a*, an intent 401*b*, a base utterance 401*c*, an industry word 401*d*, and a slot/entity 401*e*. The intent sample utterance file 401 may include one or more entries 401*x*.

For an example shown in FIG. 4B, the intent ID 401*a* may include sequent integers, for example, 1, 2, 3, and etc. The intent 401*b* may be an intent of the user's utterance, for example, booking appointment, canceling appointment, confirming a booking, and etc. The base utterance 401*c* may include an utterance of a user when the user interacts with a Bot. For example, when the intent is booking appointment, the corresponding base utterance may include "book an appointment for meter installation". For another example, when the intent is confirming a booking, the corresponding base utterance may include yes, OK, fine, etc.

The industry word 401*d* may include one or more keys words for a specific industry and/or a specific service sector. For example, the industry-specific word may include smart meter, meter, and "SM" for a water utility company. For another example, the industry-specific word may include dentist and teeth cleaning for a dental clinic. For another example, the industry-specific word may include car cleaning for a car cleaning industry.

The slot/entity 401*e* may include additional parameters for the base utterance. For example, for the intentID=10, the intent includes booking appointment with date, the base utterance includes booking appointment on Feb. 1, 2020, and the slot/entity includes the specific date (Feb. 1, 2020 for this specific example).

In one implementation, the intent-sample utterance file 401 may be pre-stored in a memory of a device where the utterance generator 400 is implemented. In another implementation, the intent-sample utterance file 401 may be fetched by the utterance generator 400 from a storage device or an on-line storage space.

Referring to FIG. 4A, the historical chat 403 may include a human-to-human conversation history in a same/similar industry and/or in a similar environment as the trained Bot. For example, the historical chat 403 may include a human-to-human conversation history, which may be a phone conversation when a patient calls a hospital representative to make a doctor appointment. For another example, the historical chat 403 may include a human-to-Bot conversation history, which may be an on-line chat conversation when a customer chats with a Bot about shipping and payment questions.

The utterance generator 400 may generate a set of utterances by at least one of the following methods: a synonym method 410, a historical chat mining method 420, and a Markov method 430. In one implementation, the utterance generator 400 may generate a set of utterances by a combination of two or three methods.

Referring to FIG. 4A, the synonym method 410 may include a tokenizer 412 to generate a token, a synonyms N-gram 414 to generate synonyms of an industry keyword, and an industry keyword generator 416 to generate/obtain at least one industry keyword. The synonym method 410 may generate a set of utterances based on an intent sample utterance file 401 including a base utterance. The synonym method 410 may obtain/generate one or more industry keyword based on the base utterance, obtain/generate synonyms based on the industry keyword, and obtain/generate a set of utterances based on various combination of the industry keyword and the corresponding synonyms.

Referring to FIG. 4A, the historical chat mining method 420 may include a K-mean cluster 422, a predict cluster 424, and a TF-IDF cosine scorer 426. The historical chat mining method 420 may generate a set of utterances based on a historical chat log 403 including utterances. The K-mean cluster may include an un-supervised learning model, which analyzes utterances in the historical chat log to obtain various tasks and intents based on the utterances in the historical chat log. The predict cluster may predict a plurality of utterances based on various combinations of the various tasks and intents. The TF-IDF cosine scorer may calculate a cosine similarity score for each of the plurality of utterances based on the utterances in the historical chat log. In one implementation, the method may include ranking the plurality of utterances based on their corresponding cosine similarity scores and select a preset number of utterances with higher cosine similarity scores. In another implementation, the method may select utterances with a cosine similarity score larger than a predetermined threshold.

Referring to FIG. 4A, the Markov method 430 may include a Markov dictionary 432, a Markov chain 434, and a TF-IDF cosine scorer 436. The Markov method 430 may generate a set of utterances based on the intent-sample utterance file 401 and/or the historical chart log 403. The Markov dictionary may be generated according to a Markov model based on the intent-sample utterance file 401 or the historical chart log 403. The Markov chain 434 may generate a plurality of utterances based on the Markov dictionary 432. The TF-IDF cosine scorer may calculate a cosine similarity score for each of the plurality of utterances based on the utterances in the intent-sample utterance file 401 and/or the historical chart log 403. In one implementation, the method may include ranking the plurality of utterances based on their corresponding cosine similarity scores and select a preset number of utterances with higher cosine similarity scores. In another implementation, the method may select utterances with a cosine similarity score larger than a predetermined threshold.

Referring to FIG. 4A, the utterance generator 400 may further include an utterance processing unit 440. The utterance processing unit 440 may receive the generated utterances from any one of the synonym method, the historical chat mining method, and/or the Markov method. The generated utterances received by the utterance processing unit 440 may be a preliminary set of utterances. The utterance processing unit 440 may label the preliminary set of utterances, check their validity by passing them through a deep neural network (DNN), and output a set of utterance training data. The preliminary set of utterances may pass the check by the DNN (i.e, the preliminary set of utterances makes sense) when the validity of the preliminary set of utterances satisfies the utterance processing unit 440.

Referring to FIG. 4A, the generated set of utterance training data may be stored in an utterance training database 450. The utterance training database 450 may be located in either a memory of a computer device or a storage of the computer device. In one implementation, the utterance training database 450 may be used by a tester to test/train a Bot. In another implementation, the utterance training database 450 may be used by a developer to train the utterance generator 400.

Figure 4C:
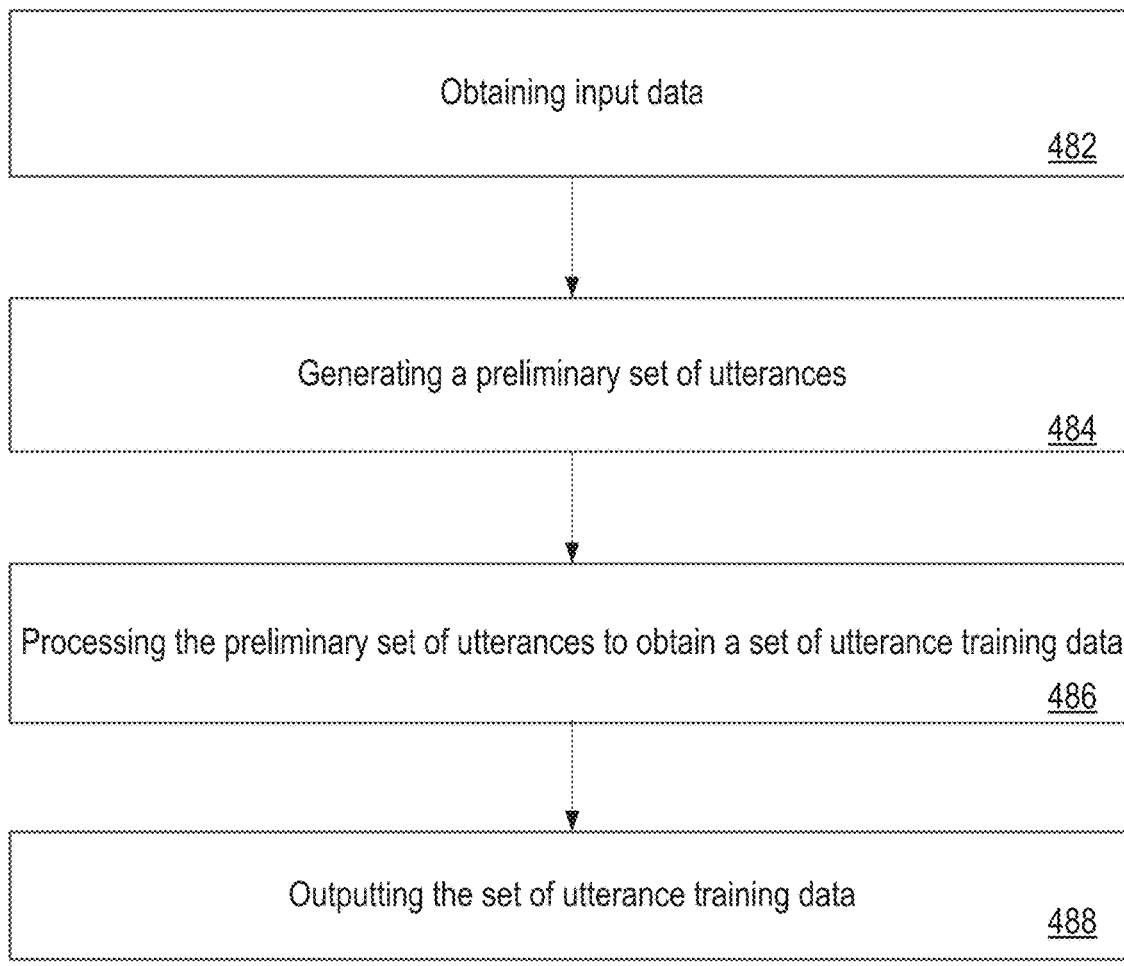
FIG. 4C shows a flow diagram of a method for generating utterances.

Referring to FIG. 4C, the present disclosure describes a method for generating a set of utterance training data. The method 480 may include step 482: obtaining input data; step 484: generating a preliminary set of utterances; step 486: processing the preliminary set of utterances to obtain a set of utterance training data; and step 488: outputting the set of utterance training data.

One example of a technical advancement achieved by the utterance generator 400 may be that the utterance generator 400 may allow automatically generating test utterances for the virtual agent. For example, keywords may be automatically obtained/generated from an intent-sample utterance file or a historical chat log. For another example, multiple computer-generated test utterances may be generated from possible derivatives of the original test utterances by various combinations of synonyms of the keywords.

The utterance generated from the utterance generator 400 may be in a text-format. The present disclosure describes a voice file simulator for generating a set of utterance training data in a voice-format.

Figure 5A:
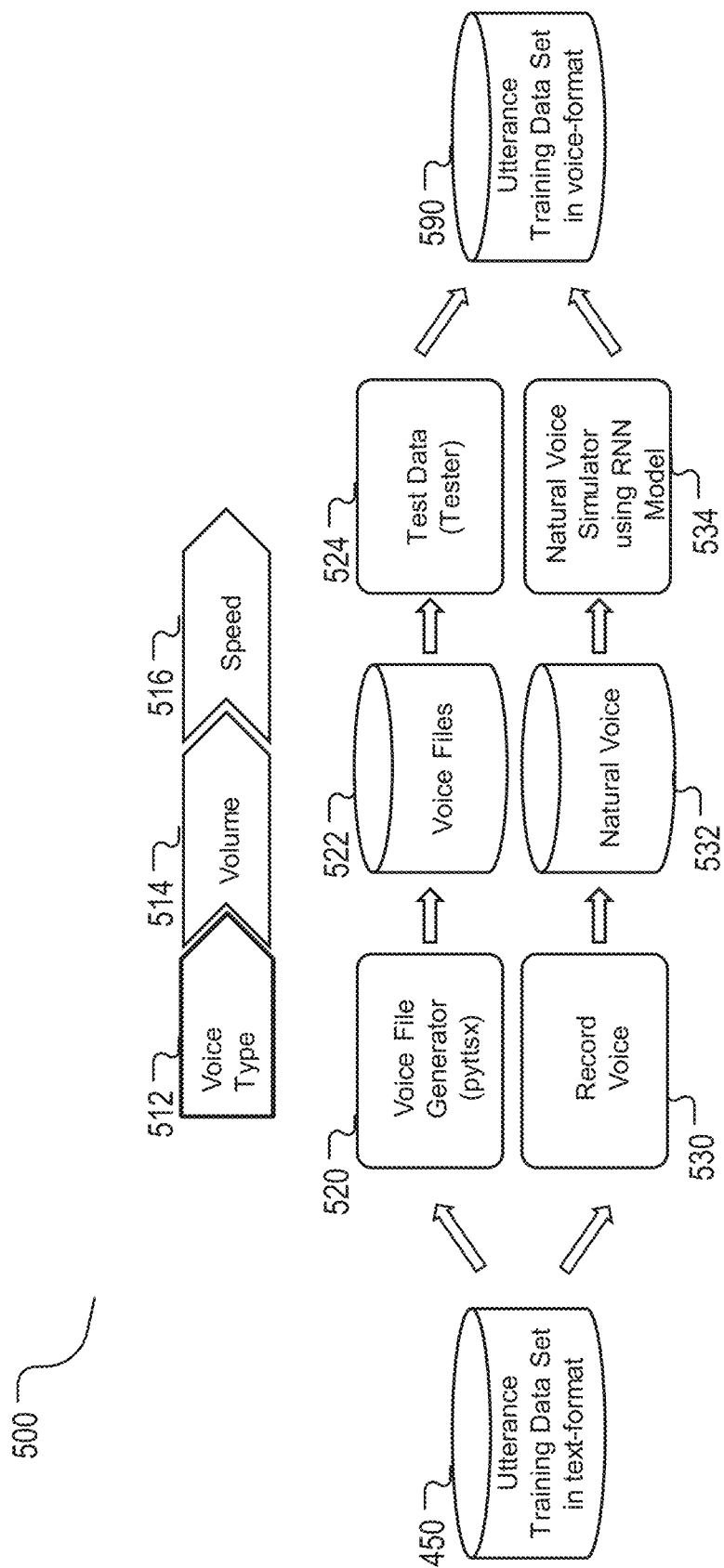
FIG. 5A shows an exemplary embodiment of a voice file simulator.

Referring to FIG. 5A, optionally, an utterance generator may include a voice file simulator 500. The voice file simulator may receive a set of utterance training data in the text-format 450 and generate a set of utterance training data in the voice-format 590 based on the set of utterance training data in the text-format. The set of utterance training data in the voice-format may include voice files with a machine-generated voice and/or human-natural voice.

Referring to FIG. 5A, the voice file simulator 500 may include a set of parameters related to the voice format, for example but not limited to, a voice type 512, a voice volume 514, and a voice speed 516. The voice type may include at least one of a language type (e.g., English, French, and Spanish), a particular accent type (e.g., British English and American English), and a gender type (e.g, a female voice and a male voice). A volume may refer to the volume of the voice for the set of utterance training data in the voice-format. The speed may refer to the speed of the voice for the set of utterance training data in the voice-format.

Referring to FIG. 5A, in one implementation, the voice file simulator 500 may include a voice file generator 520. The voice file generator 520 may include a Python text-to-sound (TTS) module to generate machine-generated voice files 522. Based on the set of utterance training data in the text-format 450 and machine-generated voice files 522, the voice file simulator 500 may generate test data in voice-format 524, and store the test data in voice format 524 as the set of utterance training data in the voice-format 590.

Referring to FIG. 5A, in another implementation, the voice file simulator 500 may optionally include a voice recorder 530 and a natural voice simulator 534. The voice recorder 530 may record natural-human voice as natural voice files 532. The natural voice simulator 534 may include a recurrent neural network (RNN) to generate voice files based on information in text-format.

The natural voice simulator 534 may, based on the set of utterance training data in the text-format 450 and the natural voice files 532, generate and store the set of utterance training data in the voice-format 590.

Figure 5B:
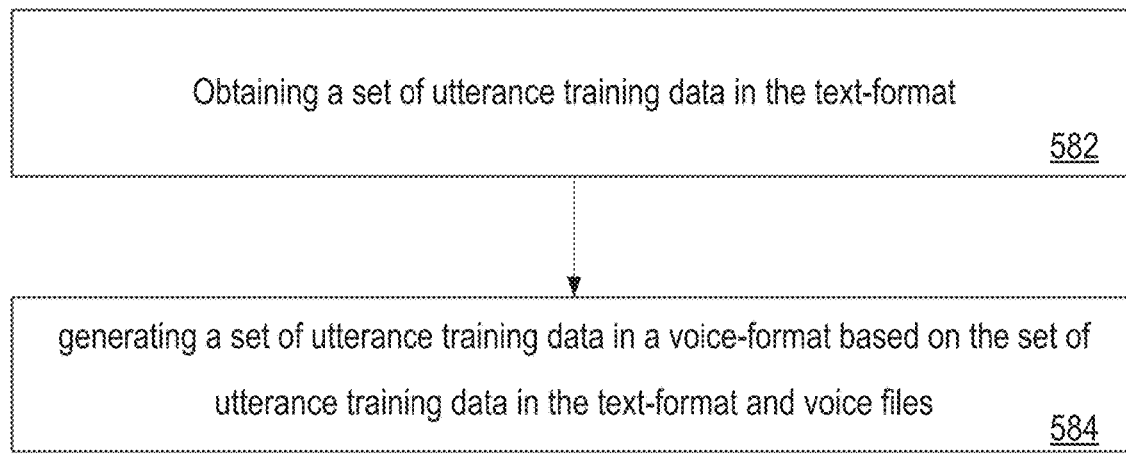
FIG. 5B shows a flow diagram of a method for generating utterance-training data in a voice-format.

Referring to FIG. 5B, the method 480 may further include step 582: obtaining a set of utterance training data in a text-format; and step 584: generating a set of utterance training data in a voice-format based on the set of utterance training data in the text-format and voice files.

Embodiment for Conversation Builder

The present disclosure describes an embodiment of a conversation builder. The conversation builder may build a set of conversations based on a set of utterance training data. The set of utterance training data may include a set of utterance training data in a text-format and/or a set of utterance training data in a voice-format.

Figure 6:
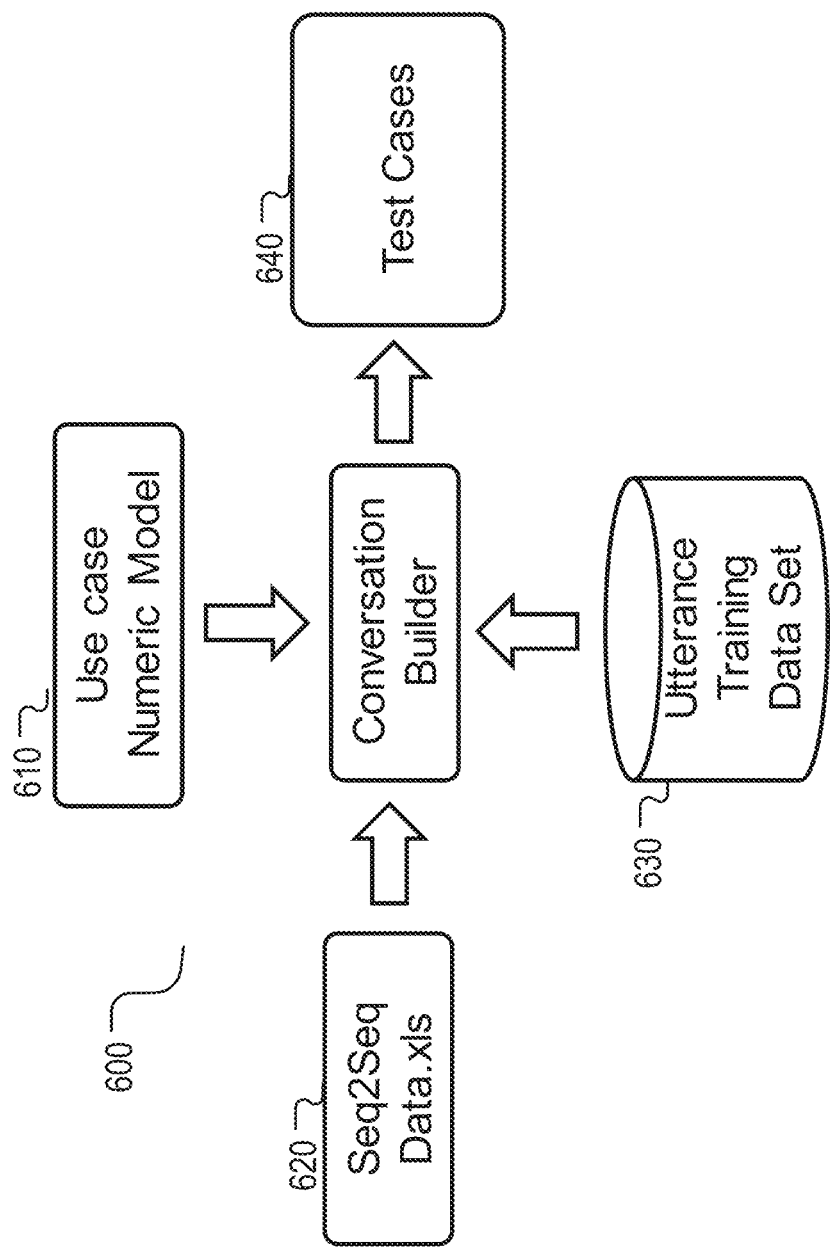
FIG. 6 shows an exemplary embodiment of a conversation builder.

Referring to FIG. 6, the present disclosure describes a framework of a conversation builder 600. The conversation builder 600 may receive inputs from a use case numeric model 610, a Seq2Seq data file 620, and a set of utterance training data 630. The conversation builder 600 may generate one or more test cases 640 based on the use case numeric model 610, the Seq2Seq data file 620, and the set of utterance training data 630. The one or more test cases may include conversations for use cases.

The present disclosure also describes an embodiment of a method for building conversations. FIG. 7A is a flow diagram for a method 700 for building a use case by a conversation builder. The method 700 may include step 710: converting a flow chart to a decision tree; step 720: converting the decision tree to a numeric model; step 730: building a Seq2Seq data set based on the decision tree and the numeric model; and step 740: reading one or more of the numeric model, the Seq2Seq model, and the set of utterance training data to generate the conversations for a use case, and in case of voice bot, picking the voice file number along with a user utterance.

The method 700 may be described by taking an example in which an intent is to book an appointment for a smart meter.

In step 710: the method 700 may include converting a flow chart to a decision tree.

Figure 7B:
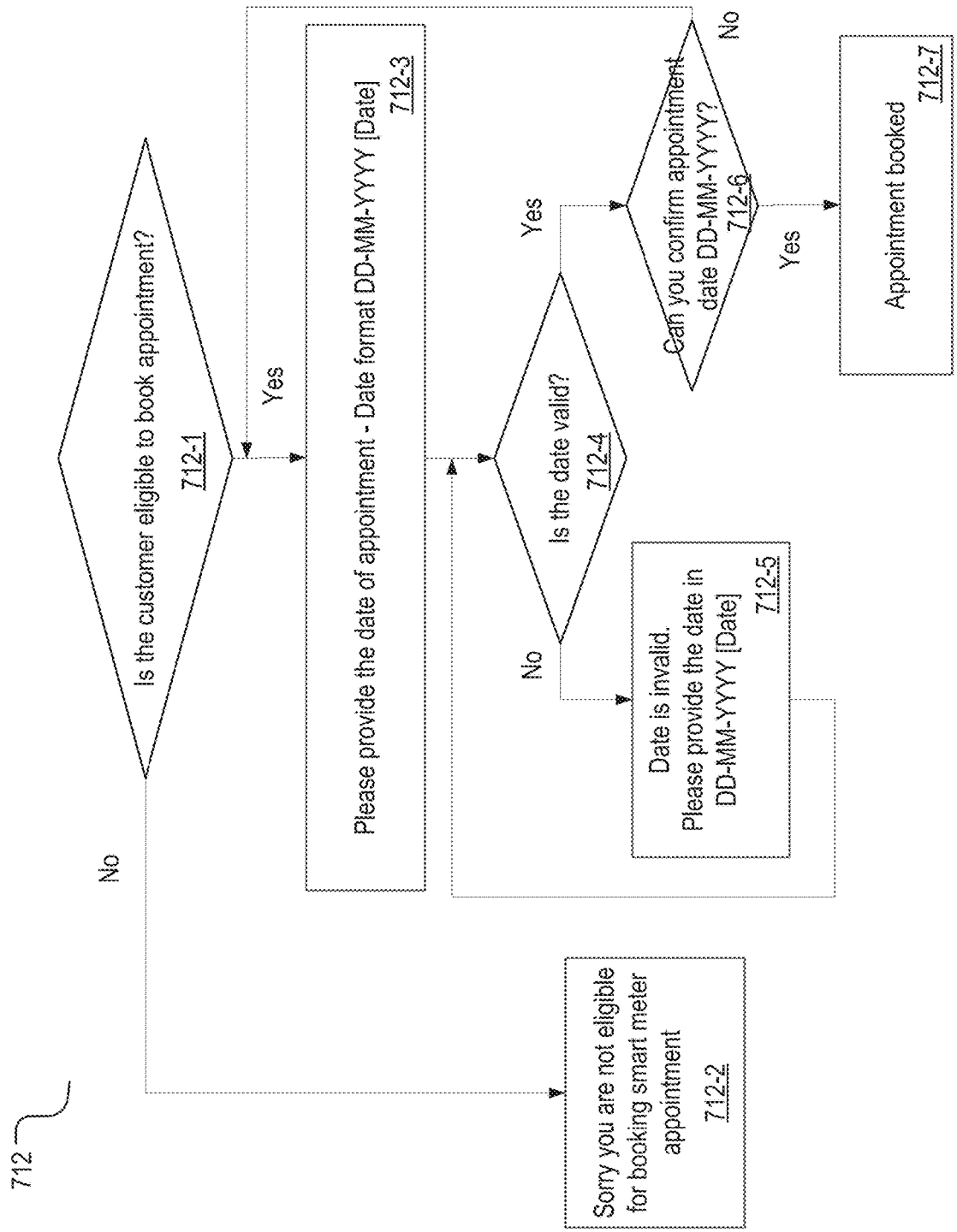
FIG. 7B shows a flow chat of an example of booking appointment.

FIG. 7B shows an example of a flow chart 712 with the intent of booking a smart meter appointment. The flow chart 712 may include one or more of the following steps. Step 712-1 may determines whether the customer is eligible to book appointment. In response to determining that the customer is not eligible to book appointment, step 712-2 may respond to the customer with "sorry, you are not eligible for booking smart meter appointment." In response to determining that the customer is eligible to book appointment, step 712-3 may respond to the customer with "please provide the date of appointment—Date format DD-MM-YYYY"; and may obtain input data as the date. Step 712-4 may determine whether the date is valid. In response to determining that the date is not valid, step 712-5 may respond to the customer with "Date is invalid. Please provide the date in DD-MM-YYYY"; obtain another input data as the date; and proceed to step 712-4. In response to determining that the date is valid, step 712-6 may respond to the customer with "Can you confirm the appointment date" and repeat the date; and determine whether the date is confirmed by the customer. In response to determining that the date is confirmed, step 712-7 may respond to the customer with "Appointment booked." In response to determining that the date is not confirmed, the method may repeat step 712-3.

Figure 7C:
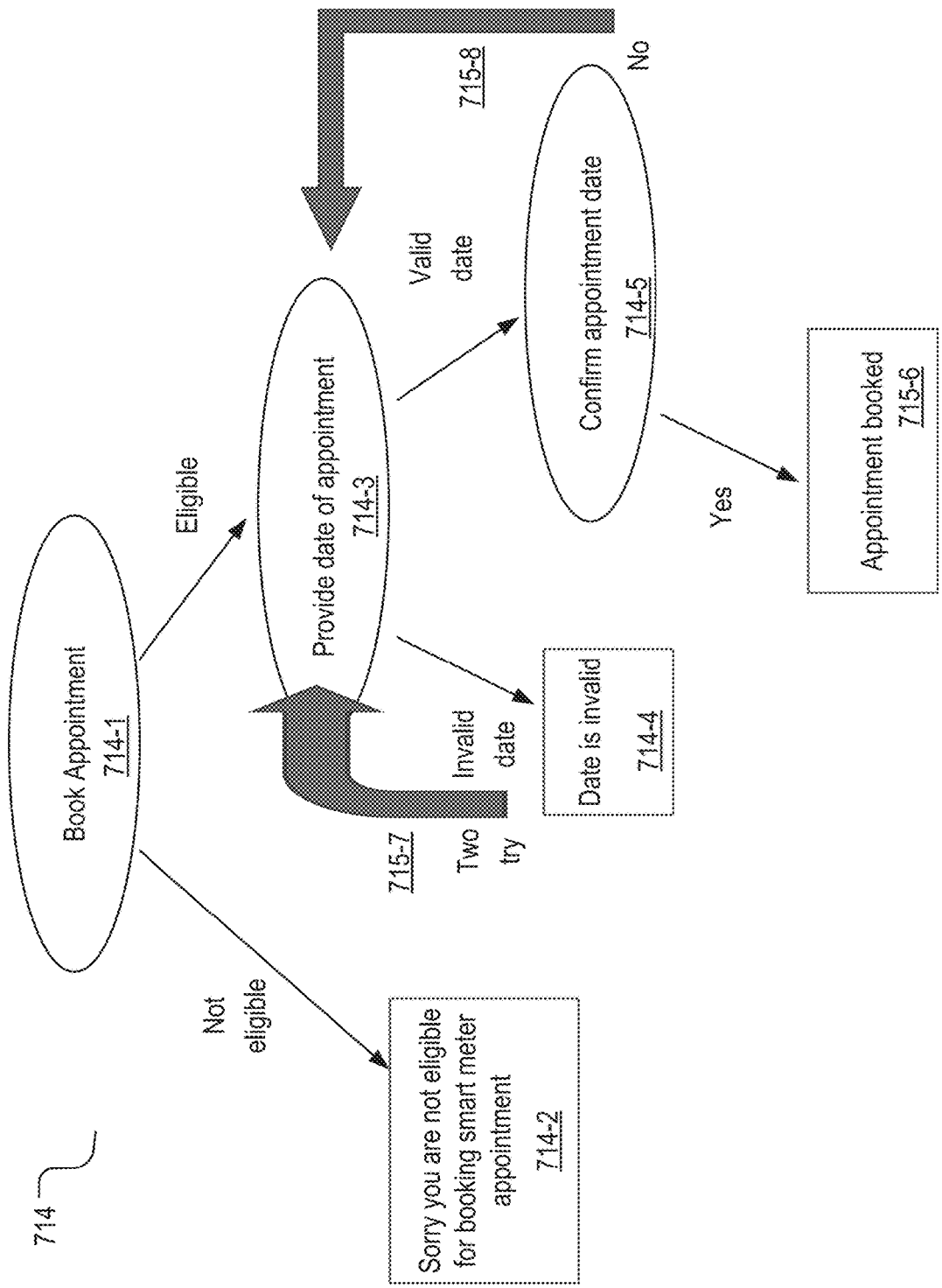
FIG. 7C shows a decision tree corresponding to the flow chart in FIG. 7B.

Referring to FIG. 7C, step 710 may convert the flow chart 712 to a decision tree 714. FIG. 7C shows an example of a decision tree 714 with the intent to book a smart meter appointment. For booking appointment 714-1, when a customer is not eligible, it is followed by 714-2; when the customer is eligible, it is followed by 714-3. For 714-3, when a received date is an invalid date, it is followed by 714-4; when the received date is a valid date, it is followed by 714-5. At 714-4, there may be a finite number of tries going back to 714-3. For example, two tries are permitted. For 714-5, when the appointment date is confirmed, it is followed by 715-6; when the appointment date is not confirmed, it is followed by 715-8 and then followed by 714-3.

In step 720, the method 700 may include converting the decision tree to a numeric model. Referring to FIG. 7D, the numeric model 722 may be converted by the method 700 based on the decision tree. The numeric model 722 may include at least one of the following columns: a first intent 722-1, an eligibility 722-2, a second intent 722-3, a date-valid 722-4, a third intent 722-5, and appointment-booked 722-6.

A numerical label may include an integer corresponding to various results for the intent. For example, a numerical label of 1 means a positive result; a numerical label of 0 means a negative result; a numerical label of −1 means it does not matter. For example, when an eligibility=0 (i.e., it is not eligibility to make appointment), the second intent does not matter so that the second intent may be −1; the date-valid does not matter so that the date-valid may be −1; and the third intent does not matter so that the third intent may be −1.

In step 730, the method 700 may include building a Seq2Seq data set based on the decision tree and the numeric model. Referring to FIG. 7E, the Seq2Seq data set 723 may be built based on the decision tree and the numeric model. The Seq2Seq data set 723 may include at least one of the following columns: an intent 732-1 and a response 732-2. For one example, for an intent of booking appointment 732-3, the response 732-4 may be "1—Please provide the date of appointment—Date format DD-MM-YYYY [Date] "; or "0—Sorry you are not eligible for booking smart meter appointment."

In step 740, the method 700 may include reading one or more of the numeric model, the Seq2Seq model, and the set of utterance training data to generate the conversations for a use case, and in case of voice bot, picking the voice file number along with a user utterance.

Embodiment for Conversation Simulator

The present disclosure describes an embodiment for simulating the generated test case data on a virtual agent.

Figure 8:
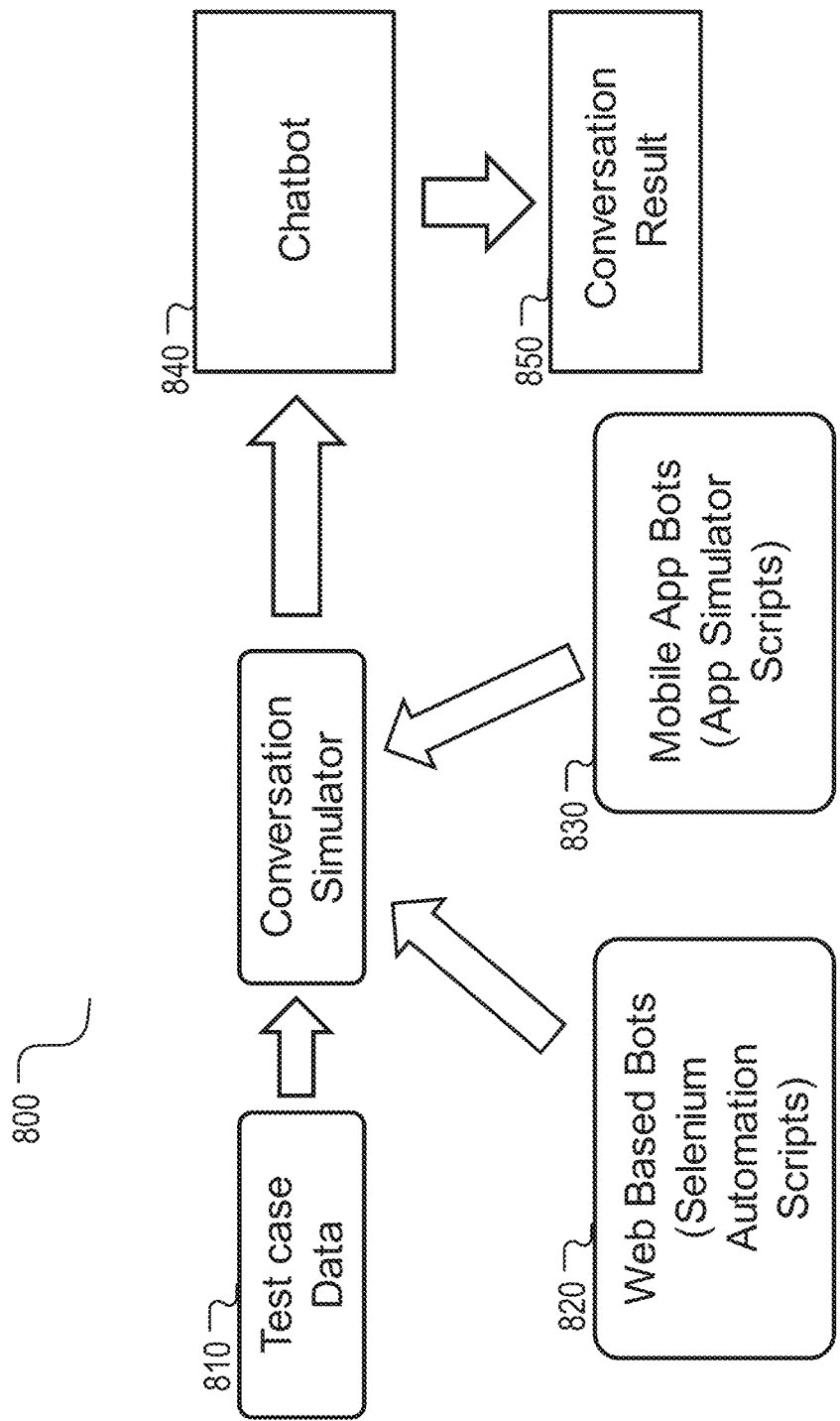
FIG. 8 shows an exemplary embodiment of a conversation simulator.

Referring to FIG. 8, the present disclosure describes a framework of a conversation simulator 800. The conversation simulator 800 may receive inputs from a set of test case data 810, test case data from web-based Bots 820, and/or mobile app Bots 830. The web-based Bots 820 may include selenium automation scripts. The mobile app Bots 830 may include application (App) simulator scripts. The conversation simulator 800 may simulate test case data on a Bot 840 (e.g., a chatbot) and record/obtain a conversation result 850 based on responses from the Bot 840. The conversation simulator 800 may further compare the observed Bot response with expected Bot response to assess Bot's performance in response to the training.

The conversation simulator 800 may simulate test case data on a Bot 840 by various means depending on a user action of the test case data. When the test case data includes text, the conversation simulator 800 may type or paste the text to the Bot; when the test case data includes voice files, the conversation simulator 800 may play the voice files to the Bot; when the test case data includes selecting a menu, a button, a radio, a checkbox, etc., the conversation simulator 800 may select the menu, select the button, select the radio, select the checkbox to the Bot.

Similarly, depending on a user action of the Bot's response, the conversation simulator 800 may record Bot's response by various means. When the Bot's response includes text, the conversation simulator 800 may copy the text responded from the Bot; when the Bot's response includes voice, the conversation simulator 800 may obtain/record the voice responded from the Bot; when the Bot's response includes displaying a menu or a windows, the conversation simulator 800 may capture the menu or the window displayed by the Bot.

FIG. 9 is a flow diagram for a method 900 for simulating conversations by a conversation simulator. The method 900 may include step 910: reading the test data in a format of a spreadsheet or a text; step 920: using the automation script to simulate the user action as given in the test data, which may include typing user text on chatbot window, selecting menu on chatbot window, and/or playing the voice file in case of voice bot; step 930: using the automation script to record the Bot's response, which may include capturing the text response from bot, when the Bot's response includes a voice, recording voice response and converting the voice response to text response, and when menus are displayed capturing the displayed menu; step 940: verifying the expected Bot response against the observed bot response, which may include an intent mismatch, not an identified utterance, and business logic failure (for example, failure of getting backend application programming interface (API) response and etc.); and step 950: generating a summary report of the conversation simulator.

Embodiment for Conversation Analyzer

The present disclosure describe an embodiment of a method or device for analyzing conversations. In one implementation, this embodiment may be a part of the AI virtual agent trainer. In another implementation, this embodiment may be implemented to interact with a natural language processing (NLP) engine to analyze conversations from a Bot.

In one implementation, this embodiment may communicate with the NLP engine to analyze a Bot's conversation in real time. In another implementation, this embodiment may obtain and analyze a historical conversation by communicating with the NLP engine.

Figure 10:
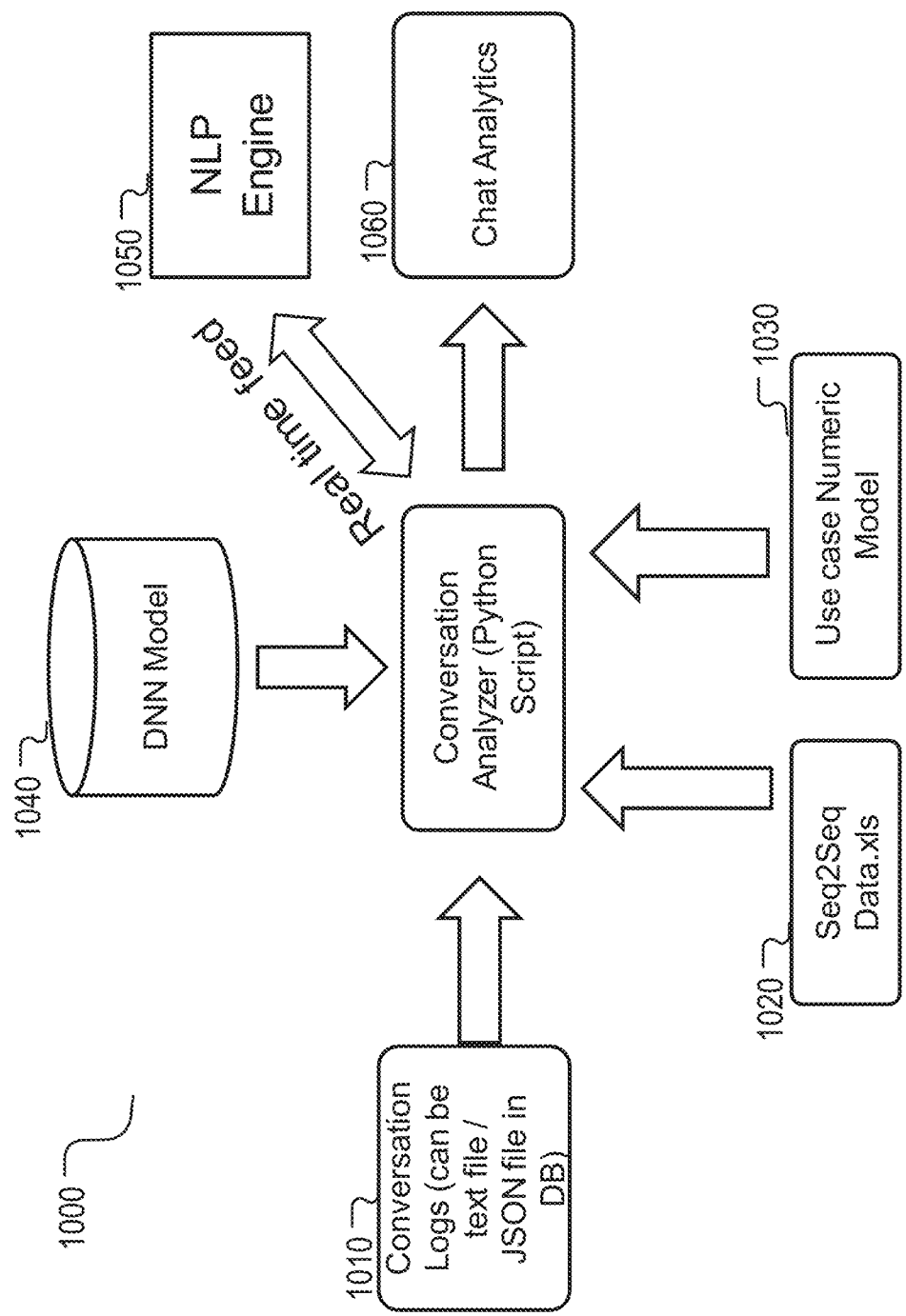
FIG. 10 shows an exemplary embodiment of a conversation analyzer.

Referring to FIG. 10, the present disclosure describes a framework of a conversation analyzer 1000. The conversation analyzer 1000 may receive inputs from a conversation log 1010, a set of Seq2Seq data 1020, and/or a use case numeric model 1030. The conversation log 1010 may include a conversation for a use case generated by a trainer. The conversation analyzer 1000 may communicate with a deep neural network (DNN) model 1040. The DNN model may analyze the conversation for the use case to obtain an expected intent.

In one implementation, the conversation analyzer 1000 may communicate with a NLP engine 1050 and receive Bot's intent from the NLP engine 1050 based on Bot's response in real-time. In another implementation, the conversation analyzer 1000 may receive Bot's intent response in a file based on Bot's historical response to the conversation for the use case.

The conversation analyzer 1000 may verify the Bot's intent against the expected intent. The conversation analyzer 1000 may output chat analytics 1060 based on the verification results.

FIG. 11A is a flow diagram for a method 1100 for analyzing conversations by a conversation analyzer. The method 1100 may include at least one of: step 1110: reading a chat line from a virtual agent corresponding to a conversation for a use case; step 1120: verifying an intent and a response of the virtual agent based on the chat line; step 1130: verifying a use case flow and flow hops of the virtual agent based on the chat line; and step 1140: generate analytical result.

In step 1110, the method 1100 may include reading a chat line from response of a virtual agent. The response of the virtual agent may be processed by a NLP engine. The chat line may include a conversation.

In step 1120, the method 1100 may include verifying an intent and a response of the virtual agent based on the chat line. Referring to FIG. 11B, step 1120 may include step 1122: when the chat line includes user utterances, verifying the intent of the virtual agent identified by the NLP engine against an expected intent obtained from the DNN model; step 1124: when the intent of the virtual agent matches the expected intent, verifying the response of the virtual agent based on a Seq2Seq flow; step 1126: identifying new keywords and utterances; and step 1128: counting a number of utterances and a number of intents based on the chat line.

Figure 11C:
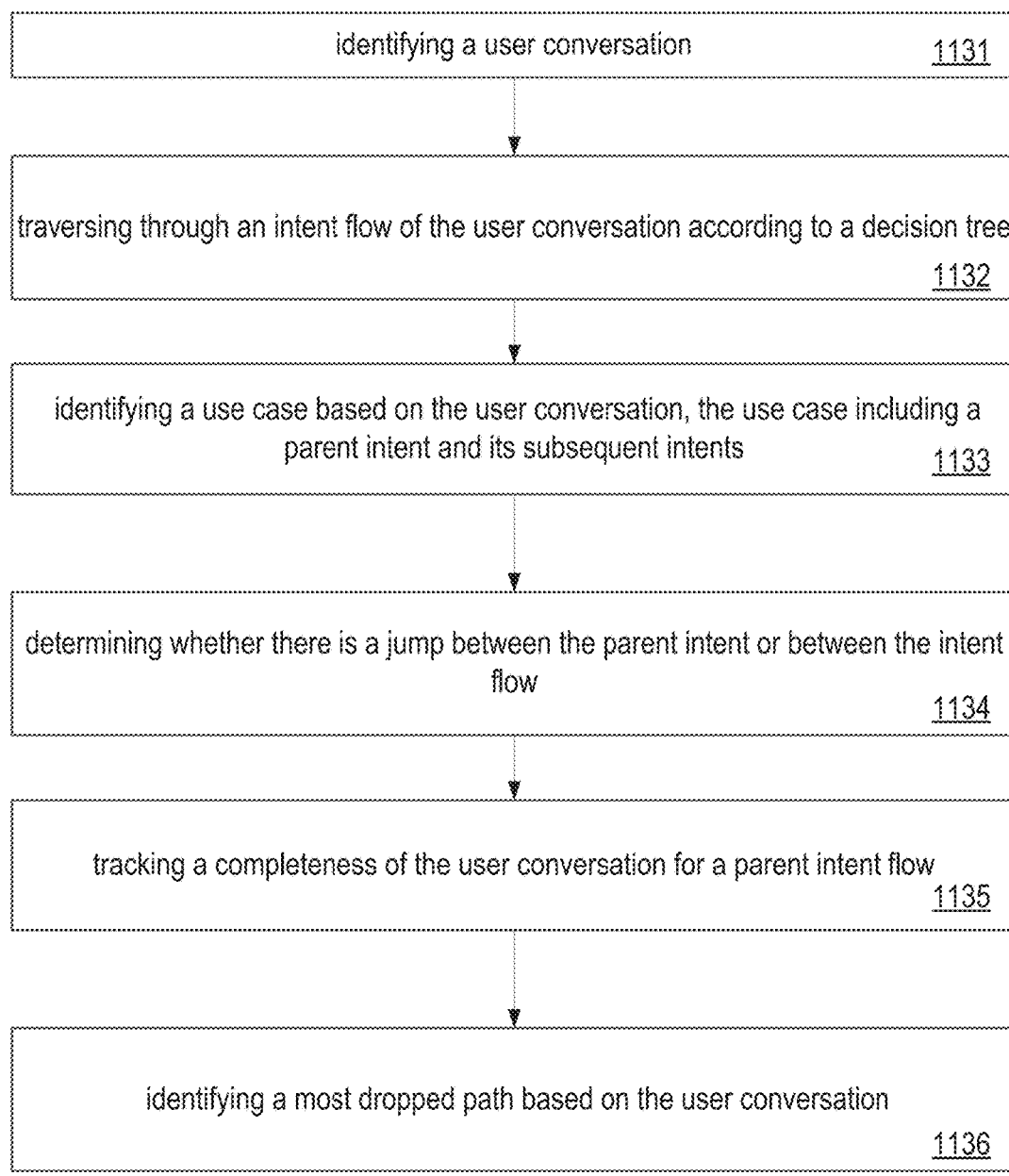
FIG. 11C shows a flow diagram of step 1130 in the method in FIG. 11A.

In step 1130, the method 1100 may include verifying a use case flow and flow hops based on the chat line. Referring to FIG. 11C, step 1130 may include step 1131: identifying a user conversation; step 1132: traversing through an intent flow of the user conversation according to a decision tree; step 1133: identifying a use case based on the user conversation, the use case including a parent intent and its subsequent intents; step 1134: determining whether there is a jump between the parent intent or between the intent flow; step 1135: tracking a completeness of the user conversation for a parent intent flow; and step 1136: identifying a most dropped path based on the user conversation.

In step 1140, the method 1100 may include generating analytical result. The analytical result may include recommendation data. The recommendation data may include a list of new utterances and keywords based on the use case. For example, the list of new utterances and keywords may refer to utterances and keywords that are not found in the training data set. Optionally, the recommendation data may include a list of failed utterances based on the use case. The list of failed utterances may refer to an utterance that is found in the training data set but does not match to results obtained from the NLP engine.

In another implementation, the conversation analyzer may receive real-time data from the NLP engine. The conversation analyzer may also assess a use case flow and verify a result against a relation and Seq2Seq model. The conversation analyzer may output an alert message when a deviation is detected.

Embodiment for Maturity Scorer and Recommender

The present disclosure describe an embodiment of a method or device for maturity scorer and recommender. In one implementation, this embodiment may be a part of the AI virtual agent trainer. In another implementation, this embodiment may be implemented to be a method or device by itself to generate a score and recommendation based on a received chat analytical result.

Figure 12:
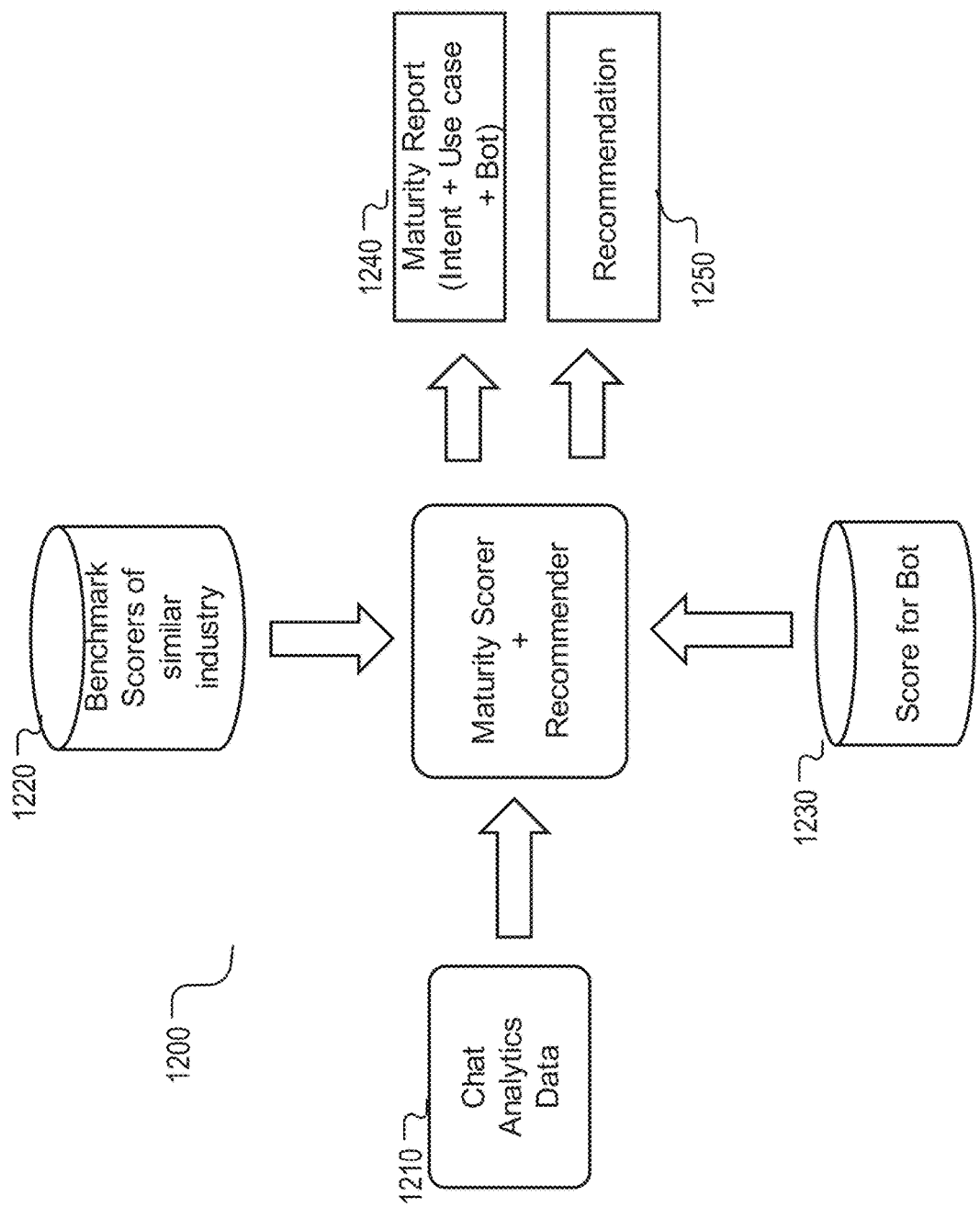
FIG. 12 shows an exemplary embodiment of a maturity scorer and recommender.

Referring to FIG. 12, the present disclosure describes a framework of a maturity scorer and recommender 1200. The maturity scorer and recommender 1200 may receive inputs from a set of chat analytics data 1210, a score for Bot 1230, and/or a benchmark scorer of similar industry 1220. The maturity scorer and recommender 1200 may output a maturity report 1240 and/or a recommendation 1250. Benchmark data for a use case may include at least one of a number of successful conversations, a number of keywords, a number of utterances, a number of intents, and a range of intent utterance distribution. A maturity score for a use case may be determined based on at least one of a number of utterances, a number of successful conversations, a number of unique keywords, a range of utterance distribution, and a range of utterance parent intents. A recommendation may include at least one of new utterances which may be added to a NLP engine, wrong intent identified which may be analyzed again by the NLP engine, identified problem flows including most dropped flows by the user, a number of user to be simulated, a number of use case flows, and a gap in the range of the utterance distribution.

FIG. 13 is a flow diagram for a method 1300 for generating a maturity score and recommendation by a maturity scorer and recommender. The method 1300 may include step 1320: computing intent maturity based on the bench mark data of set similar intent and a chat analytics data according to at least one of a number of key words, an utterance distribution, a number of utterances identified, a number of utterances mismatch, a number of utterances not identified; step 1340: computing use case maturity based on the bench mark data set of similar use cases and the chat analytics data according to at least one of a number of users, a number of successful conversations, a number of failed conversations, a number of intent failures and intent maturity for an use case; step 1360: computing Bot maturity based on the bench mark data set of similar Bots and the chat analytics data according to at least one of a number of users, a number of successful conversations, a number of failed conversations, a total number of key words learnt by the bot, and a use case maturity; step 1380: generating a recommendation based on at least one of new utterances to be added to the NLP, wrong intent identified that need to be relooked in NLP, problem flows identified (for example, most dropped flows by the user), a number of users to be simulated/use case flows, and a gap in the utterance distribution range.

In one implementation, the recommendation and/or maturity score may be used to improve the performance of the trained virtual agent, so that the virtual agent may generate more accurate and more authentic responses. In another implementation, the recommendation and/or maturity score may be used to improve the performance of the virtual agent trainer, so that the virtual agent trainer may generate a better set of utterances, for example, a set of utterances with a broader range of the utterance intent distribution.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A system for computer-based virtual agent trainer, the system comprising:
 a memory storing instructions; and
 a processor in communication with the memory, wherein, when the processor executes the instructions, the instructions are configured to cause the processor to:
  obtain input data comprising a plurality of base utterances,
  generate a preliminary set of utterances based on the input data by:
   obtaining a plurality of industry keywords based on the input data, generating a plurality of synonyms of the plurality of industry keywords, and
generating the preliminary set of utterances based on the input data and the plurality of synonyms according to at least one combination of the generated plurality of synonyms of the plurality of industry keywords,
process the preliminary set of utterances to generate a set of utterance training data,
generate a set of conversations based on the set of utterance training data,
simulate the set of conversations on a virtual agent to obtain a conversation result,
verify an intent and a response based on the conversation result,
verify a use case flow and flow hops based on the conversation result, and
generate recommendation information and a maturity report based on verification results.

2. The system of claim 1, wherein:
the set of utterance training data comprises a set of utterance training data in a text-format and a set of utterance training data in a voice-format; and
when the instructions are configured to cause the processor to process the preliminary set of utterances to generate the set of utterance training data, the instructions are configured to cause the processor to:
process the preliminary set of utterances to generate the set of utterance training data in the text-format, and
generate the set of utterance training data in the voice-format based on the set of utterance training data in the text-format and voice files according a set of voice parameters.

3. The system of claim 2, wherein:
the voice files comprises at least one of machine-generated voice files or human-generated natural voice files; and
the set of voice parameters comprises at least one of:
a voice type,
a voice volume, or
a voice speed.

4. The system of claim 1, wherein:
when the instructions are configured to cause the processor to process the preliminary set of utterances to generate the set of utterance training data, the instructions are configured to cause the processor to:
label the preliminary set of utterances, and
check validity of the preliminary set of utterances to obtain the set of utterance training data.

5. The system of claim 1, wherein, the instructions are configured to cause the processor to generate the set of conversations based on the set of utterance training data, the instructions are configured to cause the processor to:
convert a flow chart to a decision tree;
convert the decision tree to a numeric model;
build a sequence-to-sequence (Seq2Seq) data set based on the decision tree and the numeric model; and
generate the set of conversations based on the set of utterance training data, the Seq2Seq model, and the numeric model.

6. A method for computer-based virtual agent training, the method comprising:
obtaining, by a device comprising a memory storing instructions and system circuitry in communication with the memory, input data comprising a plurality of base utterances;
generating, by the device, a preliminary set of utterances based on the input data by:
obtaining a plurality of industry keywords based on the input data,
generating a plurality of synonyms of the plurality of industry keywords, and
generating the preliminary set of utterances based on the input data and the plurality of synonyms according to at least one combination of the generated plurality of synonyms of the plurality of industry keywords;
processing, by the device, the preliminary set of utterances to generate a set of utterance training data;
generating, by the device, a set of conversations based on the set of utterance training data;
simulating, by the device, the set of conversations on a virtual agent to obtain a conversation result;
verifying, by the device, an intent and a response based on the conversation result;
verifying, by the device, a use case flow and flow hops based on the conversation result; and
generating, by the device, recommendation information and a maturity report based on verification results.

7. The method of claim 6, wherein:
the set of utterance training data comprises a set of utterance training data in a text-format and a set of utterance training data in a voice-format; and
the processing the preliminary set of utterances to generate the set of utterance training data comprises:
processing, by the device, the preliminary set of utterances to generate the set of utterance training data in the text-format, and
generating, by the device, the set of utterance training data in the voice-format based on the set of utterance training data in the text-format and voice files according a set of voice parameters.

8. The method of claim 7, wherein:
the voice files comprises at least one of machine-generated voice files or human-generated natural voice files; and
the set of voice parameters comprises at least one of:
a voice type,
a voice volume, or
a voice speed.

9. The method of claim 6, wherein:
the processing the preliminary set of utterances to generate the set of utterance training data comprises:
labeling, by the device, the preliminary set of utterances, and
checking, by the device, validity of the preliminary set of utterances to obtain the set of utterance training data.

10. The method of claim 6, wherein the generating the set of conversations based on the set of utterance training data comprises:
converting, by the device, a flow chart to a decision tree;
converting, by the device, the decision tree to a numeric model;
building, by the device, a sequence-to-sequence (Seq2Seq) data set based on the decision tree and the numeric model; and
generating, by the device, the set of conversations based on the set of utterance training data, the Seq2Seq model, and the numeric model.

11. A product for computer-based virtual agent training, the product comprising:
machine-readable media other than a transitory signal;

instructions stored on the machine-readable media;
a processor in communication with the machine-readable media; and
wherein when the processor executes the instructions, the processor is configured to:
   obtain input data comprising a plurality of base utterances,
   generate a preliminary set of utterances based on the input data by:
      obtaining a plurality of industry keywords based on the input data,
      generating a plurality of synonyms of the plurality of industry keywords, and
      generating the preliminary set of utterances based on the input data and the plurality of synonyms according to at least one combination of the generated plurality of synonyms of the plurality of industry keywords,
   process the preliminary set of utterances to generate a set of utterance training data,
   generate a set of conversations based on the set of utterance training data,
   simulate the set of conversations on a virtual agent to obtain a conversation result,
   verify an intent and a response based on the conversation result,
   verify a use case flow and flow hops based on the conversation result, and
   generate recommendation information and a maturity report based on verification results.

12. The product of claim 11, wherein:
the set of utterance training data comprises a set of utterance training data in a text-format and a set of utterance training data in a voice-format;
when the instructions are configured to cause the processor to process the preliminary set of utterances to generate the set of utterance training data, the instructions are configured to cause the processor to:
   process the preliminary set of utterances to generate the set of utterance training data in the text-format, and
   generate the set of utterance training data in the voice-format based on the set of utterance training data in the text-format and voice files according a set of voice parameters;
the voice files comprises at least one of machine-generated voice files or human-generated natural voice files; and
the set of voice parameters comprises at least one of:
   a voice type,
   a voice volume, or
   a voice speed.

13. The product of claim 11, wherein:
when the instructions are configured to cause the processor to process the preliminary set of utterances to generate the set of utterance training data, the instructions are configured to cause the processor to:
   label the preliminary set of utterances, and
   check validity of the preliminary set of utterances to obtain the set of utterance training data.

14. The product of claim 11, wherein, the instructions are configured to cause the processor to generate the set of conversations based on the set of utterance training data, the instructions are configured to cause the processor to:
   convert a flow chart to a decision tree;
   convert the decision tree to a numeric model;
   build a sequence-to-sequence (Seq2Seq) data set based on the decision tree and the numeric model; and
   generate the set of conversations based on the set of utterance training data, the Seq2Seq model, and the numeric model.

\* \* \* \* \*